United States Patent [19]

Fisher et al.

[11] 4,168,890
[45] Sep. 25, 1979

[54] AUTOMATIC FOCUSING DEVICE

[76] Inventors: Charles B. Fisher, 2850 Hill Park Rd., Montreal, Quebec, Canada, H3H 1T1; Sidney T. Fisher, 53 Morrison, Montreal, Quebec, Canada

[21] Appl. No.: 922,558

[22] Filed: Jul. 7, 1978

[51] Int. Cl.² .................... G03B 7/08; G03B 3/02
[52] U.S. Cl. .................... 354/25; 250/201; 353/101
[58] Field of Search ............. 355/20; 354/3, 200, 354/195, 25; 250/201; 353/101

[56] References Cited

U.S. PATENT DOCUMENTS

| | | | |
|---|---|---|---|
| 3,211,831 | 10/1965 | Steiner | 250/201 X |
| 3,560,647 | 2/1971 | Harmon | 353/101 X |
| 3,610,934 | 10/1971 | Turner | 354/195 X |
| 3,708,619 | 1/1973 | Martin | 354/195 X |
| 3,713,371 | 1/1973 | Kurihara et al. | 354/195 X |
| 3,896,304 | 7/1975 | Aoki et al. | 250/201 |
| 3,918,071 | 11/1975 | Albrecht | 354/200 X |

*Primary Examiner*—Donald A. Griffin

[57] ABSTRACT

This invention discloses an automatic focusing device for cameras and other optical apparatus which comprises scanning means for at least a portion of the focused image, and the scanning current varies the focusing means automatically until the scanning current shows a maximum of high-frequency component to low-frequency component power.

5 Claims, 2 Drawing Figures

AUTOMATIC FOCUSING DEVICE

BACKGROUND OF THE INVENTION

This invention discloses an automatic focusing device for cameras and other optical apparatus. Cameras of the prior art have been focused automatically by projecting a sound wave from the camera to the object to be photographed, receiving the reflected sound wave at the camera, comparing the direct and reflected waves to ascertain the distance from the camera to the object to be photographed, and setting the camera lens to focus at the distance so determined. Such a device functions in a manner equivalent to dead-reckoning, with the attendant errors of measuring distance and setting the focusing means adding algebraically. We have not found prior patent art or published material which discloses an automatic optical focusing device which utilizes the ratio of the high-frequency power to the low-frequency power in the output of a device which scans the characteristics of the image, formed of an object by adjustable focusing means, to adjust such focusing means to the setting for correct focus.

BRIEF SUMMARY AND OBJECT OF THE INVENTION

This invention comprises an automatic focusing device for cameras and other optical apparatus. A portion of the image derived from an object viewed by the apparatus, by adjustable focusing means, is scanned to determine if the characteristics of the image indicate correct focus. The scanner of the device produces an electric current with a waveform partly determined by the correctness of focus of the image being scanned. The scanning current passes through frequency-sensitive means, is further processed as necessary, and operates adjustment means for setting focusing means of the optical apparatus, so as to produce the maximum amplitude high-frequency components relative to low-frequency components in the scanning current. With substantially all objects, which are viewed by optical apparatus, the setting of the focusing means, which gives the maximum amplitude of high-frequency components in the scanning current relative to the low-frequency components, corresponds to the correct focus as judged by the human eye, as the criteria for correctness of focus are the same in the two cases.

The object of this invention is to provide an automatic focusing device for optical apparatus, which is relatively free from error, and which achieves correct focus, as judged by the human eye.

BRIEF DESCRIPTION OF THE DRAWINGS

The invention is more readily understood by reference to the following drawings.

DETAILED DESCRIPTION OF THE INVENTION

Figure 1:
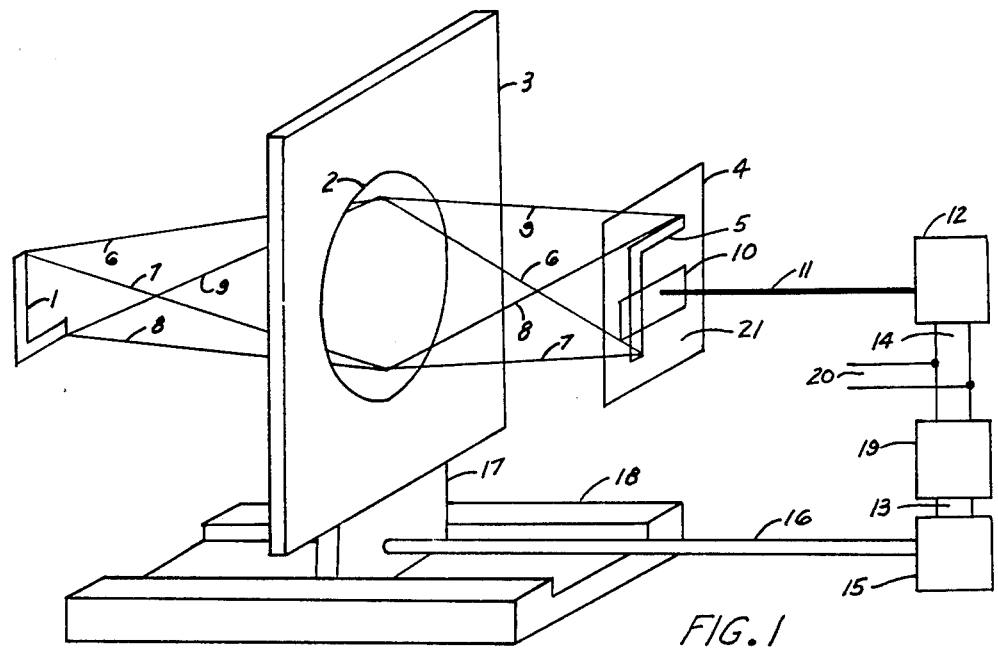
FIG. 1 shows in diagrammatic form the embodiment of the invention in a camera.
Figure 2:
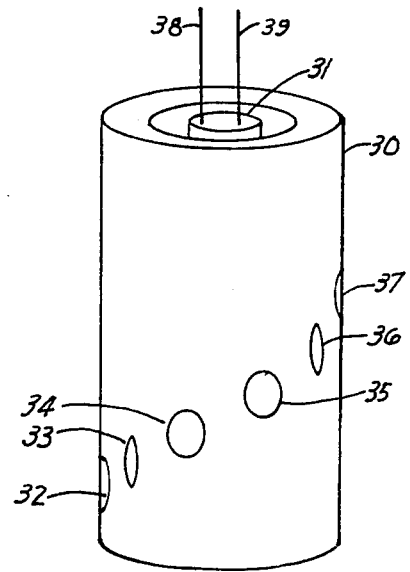
FIG. 2 shows a mechanical scanning mechanism.

FIG. 1 shows in diagrammatic form an embodiment of the invention in a camera. An object to be photographed 1, in the form of an L, is focused by means of lens 2, mounted on movable frame 3, on to screen 4. Image 5 of object 1, focused on screen 4, with the simple lens system shown here, is inverted on the screen. Rays 6, 7, 8 and 9 show the formation of image 5 from object 1. Screen 4 may be a ground-glass plate or equivalent, or may be the screen of an electronic camera tube, such as an image dissector, an image orthicon or a vidicon. If the screen is a ground-glass plate it emits light from focused image 5 lying on surface 21. An area 10, lying on surface 21, which area has been selected by obvious criteria, in a given optical device, as the part of the image which is to be most accurately focused, is scanned in a regular pattern by scanning path 11, proceeding from scanner 12. A type of mechanical scanner, for use with a ground-glass screen, is shown in FIG. 2 and explained in detail below. It suffices here to say that scanner 12 views successively portions of area 10 in a regular and repeated order, and projects the light emitted by each such portion on to a photo-sensitive cell, which causes generation of a scanning current, related in amplitude to the brightness of the portion of area 10 which is viewed by scanning path 11 at each instant. The scanning current passes over leads 14 to processor 19.

If screen 4 is the screen of an electronic camera tube of one of several well-known types, scanning path 11 is effectively an electron beam which carries scanning current to scanner 12, with an amplitude related to the brightness of the light falling on the portion of area 10 of screen 4 contacted by beam 11 at each instant. In the case of a camera tube, area 10 may be the whole area of screen 4, and screen 4, beam 11 and scanner 12 may be parts of the camera tube. The output of scanner 12 may appear at camera tube output leads 20, as well as at leads 14 leading to processor 19. The return path required in a camera tube, from screen 4 to scanner 12, is not shown in FIG. 1.

Processor 19 may amplify the scanning current received by it, and may separate the signal current by frequency-selective means into high-frequency and low-frequency bands. Each frequency band may be rectified, and a current related to the power of the high-frequency band, or to the ratio of the power of the high-frequency band to the power of the low-frequency band, is passed on to drive mechanism 15 by way of leads 13. Drive mechanism 15 operates, and moves member 16 so as to slide frame 3 holding lens 2 and supported on bracket 17, along track 18, thus altering the focus of image 5 on screen 4. If the power of the high-frequency components of the scanning current relative to the low-frequency components increases as the result of the operation of mechanism 15 and the resulting movement of lens 2, mechanism 15 continues to move lens 2 in the same direction. If the motion of lens 2 reduces the relative power of the high-frequency components, logic circuits in mechanism 15 reverse the direction of motion of lens 2, which then continues to move in the new direction of maximum high-frequency power output from scanner 12. Simple logic circuits disconnect the drive mechanism after a predetermined number of reversals of direction of drive mechanism 15. We will show below that at the correct position of focus of lens 2 the relative high-frequency power output of scanner 12 reaches a maximum, that is if lens 2 moves in either direction from the correct position the relative power of the high-frequency components delivered by the scanner decreases. At this point logic circuits of simple and well-known types located in mechanism 15 function to reverse and ultimately to stop the motion of mechanism 15, and a correctly focused image appears on screen 4.

FIG. 2 shows a simple mechanical scanner which may be used as scanner 12 in FIG. 1, when screen 4 of FIG. 1 is a ground-glass plate or equivalent. In FIG. 2 a circular cylindrical tube 30 rotates concentrically, driven by a motor not shown, on an axis not shown. Tube 30 has a series of spirally-spaced perforations, such as are shown at 32 to 37 inclusive, and contains along its axis a stationary photo-sensitive device 31, with or without focusing lenses and an external power source, and with output leads 38 and 39. As tube 30 rotates, each perforation on tube 30, in conjunction with photo-sensitive device 31, scans a path across area 10 of screen 4 in FIG. 1. When tube 30 of FIG. 2 has completed one complete revolution, area 10 on screen 4 of FIG. 1 has been scanned in a series of narrow parallel paths.

When the image of a bar on a screen is repeatedly scanned in narrow strips, in the way that the image of a bar crossing area 10 on screen 4 of FIG. 1 is scanned by path 11, then the spectrum of the scanning current from the scanner depends on the characteristics of the focused image, and hence on the accuracy of focusing of the image. If the image is correctly focused, abrupt variations in brightness across the object focused result in abrupt variations in brightness across the image. When the scanning path crosses a region of abrupt variation in brightness repeatedly in one direction, the waveform of the scanning current consists of a series of rectangular pulses, whose height, duration and spacing depend on the scanning rate and the width of the variation of brightness. A typical example of such a scanning current is a series of square pulses, with spacing equal to their width. Neglecting the d-c component and the absolute amplitude as not significant, we then have a wave with the following components:

$$\cos x - \tfrac{1}{3} \cos 3x + 1/5 \cos 5x - 1/7 \cos 7x \ldots$$

An incorrectly focused image of an object with an abrupt variation in brightness might have a sine-wave distribution of brightness. In this case the scanning current consists of a single a-c component, cos x. Thus in the focusing of objects with abrupt variations in brightness, which include substantially all objects focused by optical apparatus, the scanning current from scanning the focused images has high-frequency components which increase in amplitude and extend farther in frequency, relative to the low-frequency components, the more nearly the optical apparatus is correctly focused.

In this invention the band of high-frequency components, above some particular frequency determined by the scanning rate and the precision of focus desired, is passed through frequency-selective means, rectified and filtered if desired, and utilized by a drive mechanism which adjusts the focusing means, to a setting corresponding to the correct focus of the image on the screen. The basic device includes means to select low-frequency components of the scanning current by one frequency-selective means, and the high-frequency components by a second frequency-selective means, to rectify and filter both groups of components separately, to compare their amplitudes in a comparator, and to automatically adjust the focusing means until the ratio of the amplitude of the power of the high-frequency group to the power of the low-frequency group is a maximum. In order to increase this ratio the scanning current may be passed through a circuit which accentuates the high-frequency portion of the spectrum. The selective means, rectifiers, filters, comparator and accentuating circuit, if used, may be considered as part of processor 19 of FIG. 1. In some devices it may also be necessary to include a delay equalizer in processor 19, to prevent undesirable oscillation of the drive mechanism, caused by unequal shift of different frequencies in the various circuits involved.

In the apparatus of FIG. 1 the characteristics of the image formed on the screen by the focusing means are ascertained by scanning means, the resultant scanning current has the high-frequency components selected and is otherwise processed as necessary by amplification, delay and rectification, and operates a drive mechanism which adjusts the focusing means, in a direction which increase the relative power of the high-frequency components of the scanning current in both amplitude and frequency range. Adjustment of the focusing means continues automatically until the high-frequency components reach a maximum relative power, which is the position of the focusing means for correct focus of the image on the screen. Thus a self-equilibrating negative-feedback loop has been provided, which comprises the image focused on the scanning path, the scanner, the processor, the drive mechanism, the adjustable focusing means, and the return to the image focused on the screen. This device is therefore intrinsically free from focusing errors, compared to a dead-reckoning device. Achievement of the correct focus automatically may be improved substantially by following the well-known principles of design of negative-feedback loops, such as high amplification, constant phase shift in the pass-band, and an appropriate reduction of gain outside the pass-band of the feedback loop.

The words "optical", "light", "view" and similar words are used herein in a general sense to imply use of electromagnetic radiation outside the spectrum visible to the human eye as well as the visible spectrum.

What we claim is:

1. An optical focusing device comprising scanning means which comprises a scanning path of relatively small area which regularly traverses at least a portion of the scanned image, causing a current containing high and low frequency components to flow in said scanner related in amplitude at each instant to the brightness of the part of scanned image to which said path is directed, frequency-selective means which passes said high-frequency components to one input of an amplitude comparator, and passes the low-frequency components to a second input of said comparator, so that the output power of said comparator is related to the ratio of the power of said high-frequency components to the power of said low-frequency components, and said output of said comparator is utilized to operate adjustment means for said focusing device.

2. An optical focusing device is accordance with claim 1 in which said adjustment means operates in a first direction, and then reverses direction if said scanning current, after passing through said frequency-selective means, decreases said high-frequency or said ratio of high-frequency to low-frequency power when said adjustment means moves in said first direction.

3. An automatic focusing device in accordance with claim 1, in which said adjustment means continues to operate in the same direction, as long as said scanning current, after passing through said frequency-selective means, continues to increase in high-frequency or in the ratio of high-frequency to low-frequency power.

4. An optical automatic focusing device in accordance with claim 3, in which said adjustment means ceases to operate after its direction has been reversed a predetermined number of times.

5. An automatic focusing device in accordance with claim 1, in which said adjustment means reverses direction if said scanning current, after passing through said frequency-selective means, decreases in high-frequency power or in high-frequency relative to low-frequency power.

* * * * *